(12) United States Patent
Moran et al.

(10) Patent No.: US 8,584,173 B2
(45) Date of Patent: Nov. 12, 2013

(54) AUTOMATIC SELECTION OF VIDEO PROGRAMMING CHANNEL BASED ON SCHEDULING INFORMATION

(75) Inventors: William Norris Moran, Highlands Ranch, CO (US); Michael Cavanaugh, Englewood, CO (US); Anand Menon, Parker, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 593 days.

(21) Appl. No.: 12/500,823

(22) Filed: Jul. 10, 2009

(65) Prior Publication Data

US 2011/0007218 A1    Jan. 13, 2011

(51) Int. Cl.
*H04N 5/445*    (2011.01)
*H04N 5/46*    (2006.01)
*H04N 5/50*    (2006.01)
*G06F 3/00*    (2006.01)
*G06F 13/00*    (2006.01)

(52) U.S. Cl.
USPC .............................. 725/59; 348/555; 348/731

(58) Field of Classification Search
None
See application file for complete search history.

(56) References Cited

U.S. PATENT DOCUMENTS

| | | | |
|---|---|---|---|
| 5,461,427 A | 10/1995 | Duffield et al. | |
| 5,555,097 A | 9/1996 | Joung et al. | |
| 5,600,366 A | 2/1997 | Schulman | |
| 6,108,044 A | 8/2000 | Shin | |
| 6,115,074 A * | 9/2000 | Ozkan et al. | 348/465 |
| 6,249,320 B1 * | 6/2001 | Schneidewend et al. | 348/569 |
| 6,335,762 B1 * | 1/2002 | Lee | 348/558 |
| 6,741,293 B1 * | 5/2004 | Obuchi | 348/554 |
| 7,061,542 B1 * | 6/2006 | Ikeguchi | 348/558 |
| 7,697,070 B1 * | 4/2010 | Dugan et al. | 348/556 |
| 7,742,104 B2 * | 6/2010 | Kim | 348/554 |
| 2006/0038923 A1 * | 2/2006 | Dinwiddie | 348/569 |
| 2006/0171390 A1 * | 8/2006 | La Joie | 370/390 |
| 2010/0162292 A1 * | 6/2010 | Potrebic et al. | 725/27 |
| 2010/0205633 A1 * | 8/2010 | Kataoka et al. | 725/39 |

(Continued)

FOREIGN PATENT DOCUMENTS

WO    0201879 A2    1/2002

OTHER PUBLICATIONS

"Guidelines on Implementation and Usage of Service Information (SI)", Digital Video Broadcasting (DVB), Oct. 3, 2003, Geneva, Switzerland, 53 pages.

(Continued)

*Primary Examiner* — Brian Pendleton
*Assistant Examiner* — Ryan Stronczer
(74) *Attorney, Agent, or Firm* — Ingrassia Fisher & Lorenz, P.C.

(57) ABSTRACT

A method of automatically selecting between a first video programming channel and a second video programming channel in a video content receiver is presented. In the method, the receiver receives video programming carried over at least one of the first channel and the second channel, as well as scheduling information regarding the two channels. The receiver also receives a channel selection for one of the two channels, such as from a user. In response to the channel selection, the receiver compares the scheduling information for the first channel to a current time value. If the scheduling information indicates the first channel is not currently carrying video programming that is available for presentation to the user, the receiver selects the second channel for presentation to the user; otherwise, the receiver selects the first channel.

15 Claims, 8 Drawing Sheets

(56) References Cited

U.S. PATENT DOCUMENTS

| | | | |
|---|---|---|---|
| 2010/0325652 A1* | 12/2010 | Lee et al. | 725/28 |
| 2011/0126247 A1* | 5/2011 | Howarter et al. | 725/95 |
| 2011/0131619 A1* | 6/2011 | Hasek et al. | 725/93 |
| 2011/0296475 A1* | 12/2011 | Craner | 725/90 |
| 2012/0072952 A1* | 3/2012 | Vaysman et al. | 725/40 |

OTHER PUBLICATIONS

"Linking HDTV Events to SDTV Services—Proposal for the extension of DVB specifications and guidelines", Digital Video Broadcasting (DVB), May 19, 2008, Geneva Switzerland, 7 pages.

Burzi, G. et al., "GBS0619r3—Proposed Modifications to Event_Likage Descriptor", Mar. 16, 2009, Geneva, Switzerland, 3 pages.

Vlot, Marnix, "Discussion Paper Dynamic HD Simulcast Linkage", DVB/GBS0601, Digital Video Broadcasting (DVB), Aug. 26, 2008, 9 pages.

International Search Report and Written Opinion of the International Searching Authority for International Application No. PCT/US2010/041334, issued by the European Patent Office and mailed on Oct. 1, 2010, 14 pages.

Dugan, Michael T. et al., U.S. Appl. No. 11/118,464, filed Apr. 29, 2005.

* cited by examiner

AUTOMATIC SELECTION OF VIDEO PROGRAMMING CHANNEL BASED ON SCHEDULING INFORMATION

BACKGROUND

Many television broadcast systems, including terrestrial ("over-the-air"), cable, and satellite television broadcast systems, provide literally hundreds of broadcast channels over which individual television programs, such as movies, sporting events, news programs, series episodes, and other television programs, may be communicated to thousands or millions of individual television broadcast receivers, or "set-top boxes". In turn, each set-top box is configured to present one or more such programs to a user, as selected or determined by the user, by way of a television, video monitor, or similar display device.

With the large number of programming channels available, a program or event may be broadcast or otherwise presented over two separate channels. For example, many local television stations and cable networks provide both a standard-definition television channel and a high-definition television channel. As a result, the same television program or event may be presented over the "paired" channels so that viewers in possession of a set-top box and connected television that are both capable of decoding and/or presenting high-definition may view a high-definition version of the program, while those viewers not so equipped may still enjoy the same video content by way of the standard-definition version.

In some cases, a high-definition channel paired with a standard-definition channel may not carry any programming for periods of time during the day. For example, a satellite or cable television system may allocate a limited amount of communication bandwidth to several different networks, thus allowing only a subset of the networks to use that bandwidth for high-definition content at any particular time.

In another example, two programming channels operated by different content providers, such as different broadcast networks or television stations, may carry the same content, such as a sporting event, possibly by way of the same or different production teams. However, due to contractual agreements between the broadcasting entities and the sports teams or leagues involved, one of the two channels may be "blacked out" for viewers located in one or more specific geographical areas, forcing those viewers that wish to view the sporting event to select the remaining channel available for carrying the desired content.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
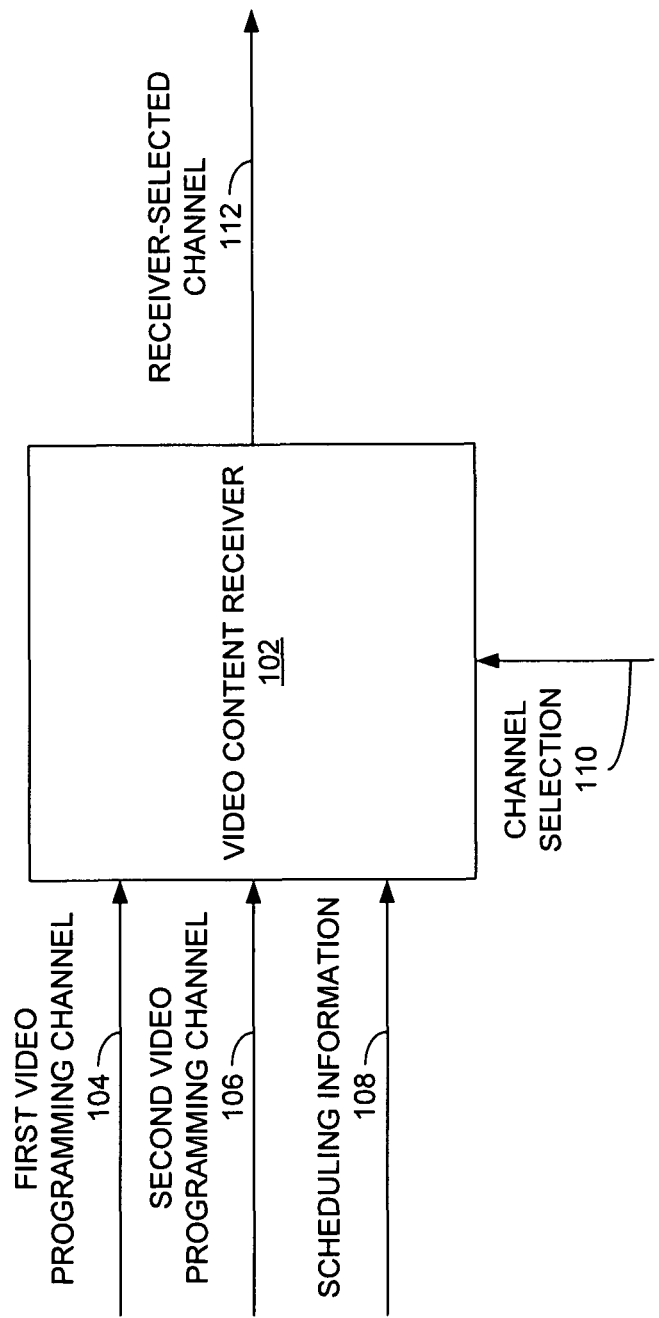
FIG. 1 is a block diagram of a video content receiver configured to automatically select a video programming channel based on scheduling information according to an embodiment of the invention.

FIG. 1 is a graphical representation of a video content receiver 102. Examples of the video content receiver 102 may include, but are not limited to, terrestrial ("over-the-air") television set-top boxes, cable television set-top boxes, satellite television set-top boxes, television sets, desktop computers, laptop computers, mobile communication devices, and other communication devices capable of receiving and processing both video programming channels and scheduling information regarding the programming carried over those channels. In one embodiment, a video programming channel carries a video program or event, such as a news program, sporting event, movie, weekly episode, or other program, that is being transmitted or broadcast to one or more video content receivers 102.

Figure 2:
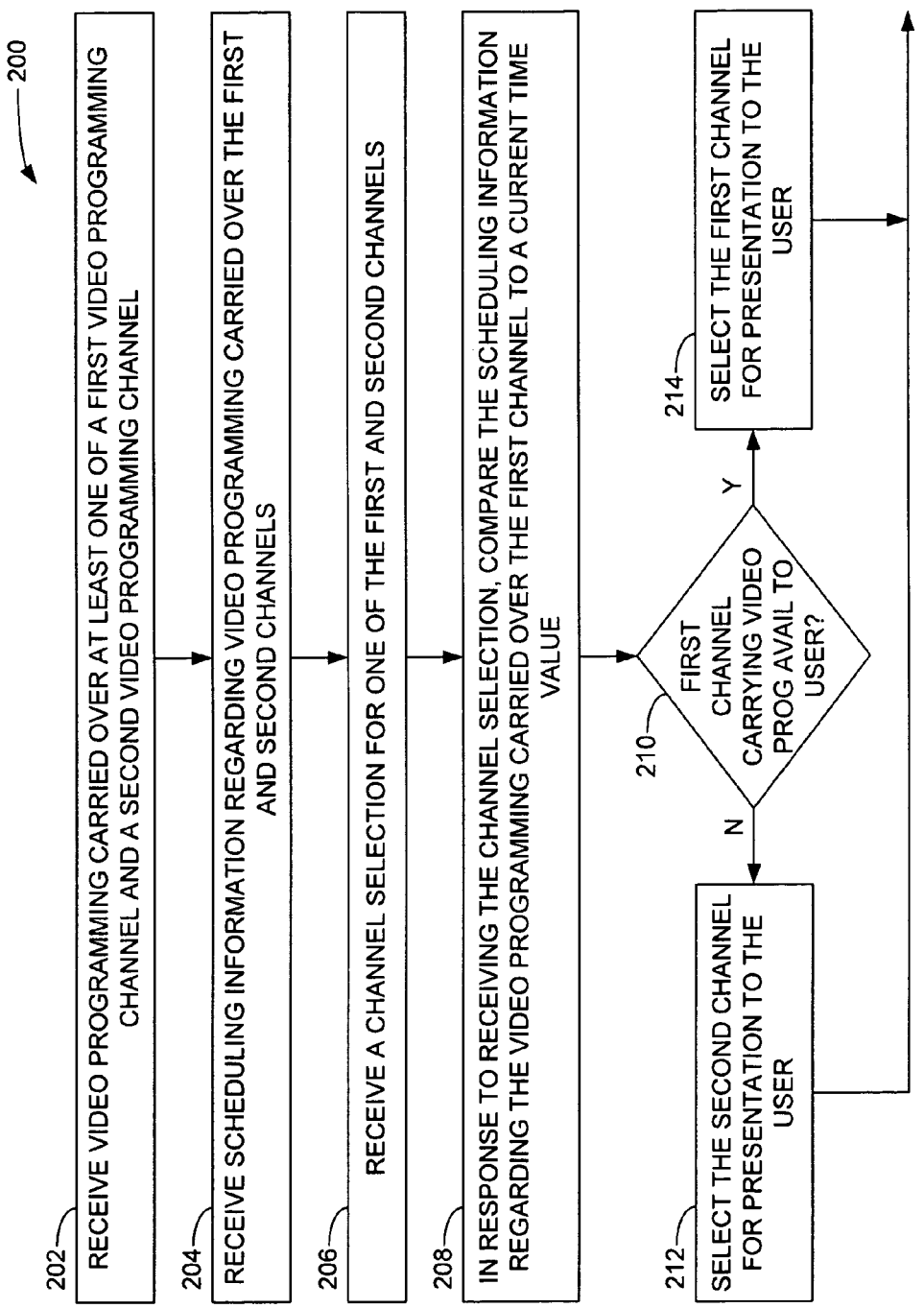
FIG. 2 is a flow diagram of a method according to an embodiment of the invention of automatically selecting a video programming channel based on scheduling information.

FIG. 2 presents a flow diagram of a method 200 of automatically selecting between a first video programming channel 104 and a second video programming channel 106 in the video content receiver 102. In the method 200, the video content receiver 102 receives video programming carried over at least one of the first channel 104 and the second channel 106 (operation 202). The receiver 102 also receives scheduling information 108 regarding video programming carried over the first channel 104 and the second channel 106 (operation 204). Generally, the scheduling information 108 indicates the video programs that are transmitted on each of the channels 104, 106, along with the time periods during which each of these programs are transmitted. The video content receiver 102 also receives a channel selection 110, typically from a user, for one of the channels 104, 106 (operation 206). In other examples, the channel selection 110 may be sourced by some other entity external to the receiver 102. In response to receiving the channel selection 110, the video content receiver 102 compares the scheduling information 108 regarding the video programming carried over the first channel 104 to a current time value (operation 208). If the scheduling information 108 indicates the first channel 104 is not currently carrying video programming that is available for presentation to the user (operation 210), then the video content receiver 102 selects the second channel 106 for presentation to the user (operation 212). Otherwise, the receiver 102 selects the first channel for presentation to the user (operation 214).

While the operations of FIG. 2 are depicted as being executed in a particular order, other orders of execution, including concurrent execution of two or more operations, may be possible. In another embodiment, a computer-readable storage medium may have encoded thereon instructions for at least one processor or other control circuitry of the video content receiver 102 of FIG. 1 to implement the method 200.

As a result of at least some embodiments of the method 200, the video content receiver 102, by processing the scheduling information 108, may automatically select a channel different from that selected by a user to provide the user with the video content or programming the user desires. Other advantages may be recognized from the various implementations of the invention discussed in greater detail below.

Figure 3:
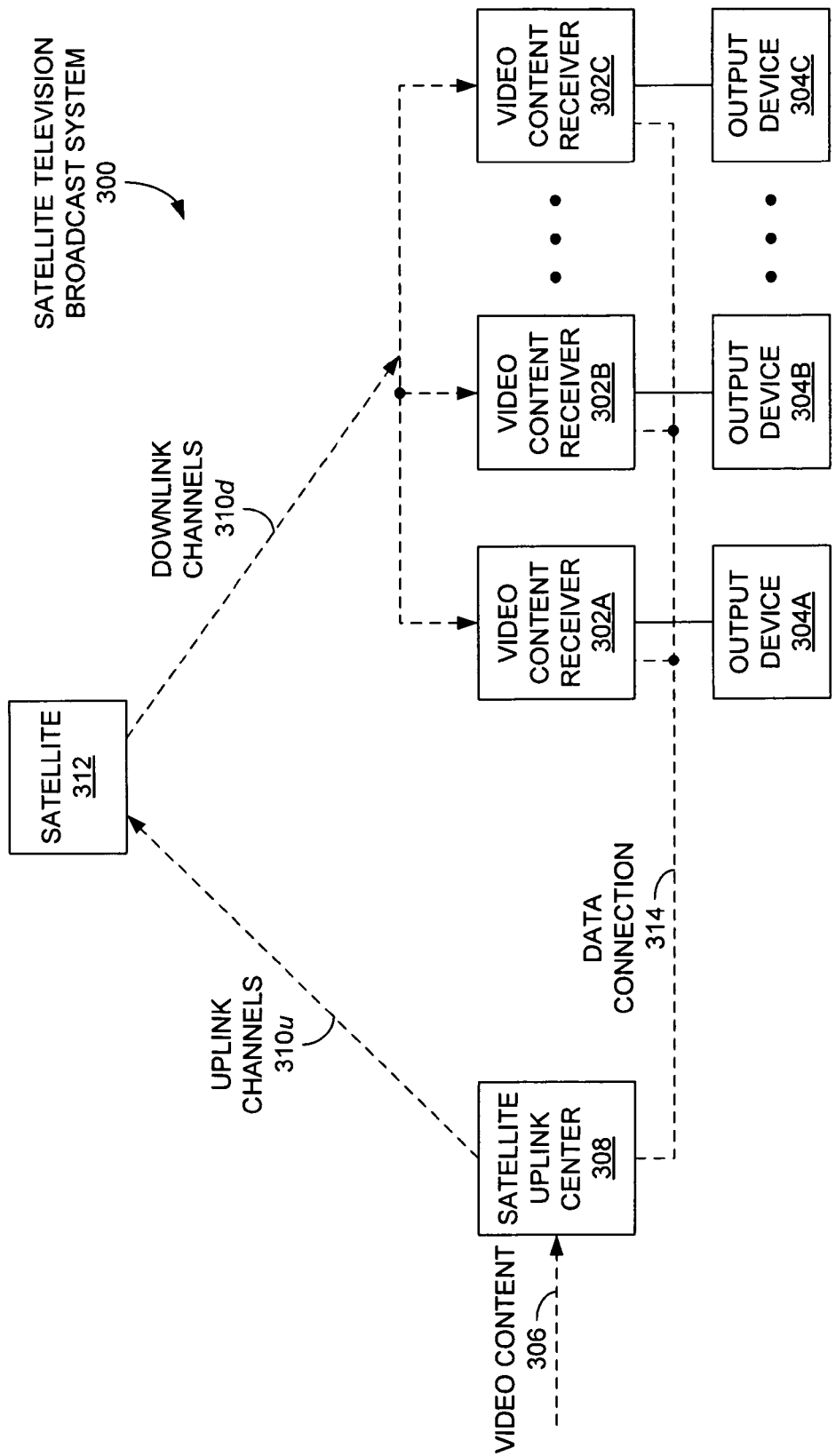
FIG. 3 is a block diagram of a satellite television broadcast system according to an embodiment of the invention.

FIG. 3 is a block diagram of a satellite television broadcast system 300 according to another embodiment of the invention. While the following discussion focuses particularly on satellite television programming, other implementations as described hereinafter may involve other video programming communication systems, including, but not limited to, cable and terrestrial television broadcast systems, Internet and other wide-area network (WAN) video communication systems, and the like.

As shown in FIG. 3, a satellite uplink center 308 serves as a video content transmission system for the delivery of video programming to a number of video content receivers 302A, 302B, 302C, which in this case may be referred to as satellite television set-top boxes. More particularly, the satellite uplink center 308 may receive video content 306 from any number of video content sources (not explicitly shown in FIG. 3), such as major television broadcast networks, movie channels, and national and regional sports networks. In other implementations, at least some of the video content 306 may be generated internal to the satellite uplink center 308.

The satellite uplink center 308 transfers the video content or programming 306 over one or more uplink channels 310$u$ to an orbiting satellite 312. In turn, the satellite 312 retransmits the programming 306 by way of one or more transponders located thereon over one or more downlink channels 310$d$ to the multiple video content receivers 302. In one embodiment, the uplink and downlink channels 310 may not correspond to the individual programming channels being transmitted to the video content receivers 302A. For example, each of the uplink and downlink channels 310 may possess the capacity to carry multiple video programming channels, such as the first channel 104 and the second channel 106 of FIG. 1.

In addition to the video programming, the satellite uplink center 308 may provide scheduling information regarding the various programming channels being transmitted, such as the scheduling information 108 of FIG. 1. In one implementation, the scheduling information may be transmitted by way of the uplink and downlink channels 310 as metadata associated with the video programming being transferred. In another example, the scheduling information may be transferred from the satellite uplink center 308 or another device of the broadcast system 300 by way of a data connection 314 with each of the video content receivers 302. Such a data connection 314 may be a telephone connection, an Internet connection, or other means of wired or wireless communication. Examples of the scheduling information are discussed in greater detail below.

As shown in FIG. 3, each of the video content receivers 302 is coupled to an output device 304, such as a television or video monitor, to present those portions of the video programming received over the downlink channels 310$d$ under the direction of the user.

Figure 4:
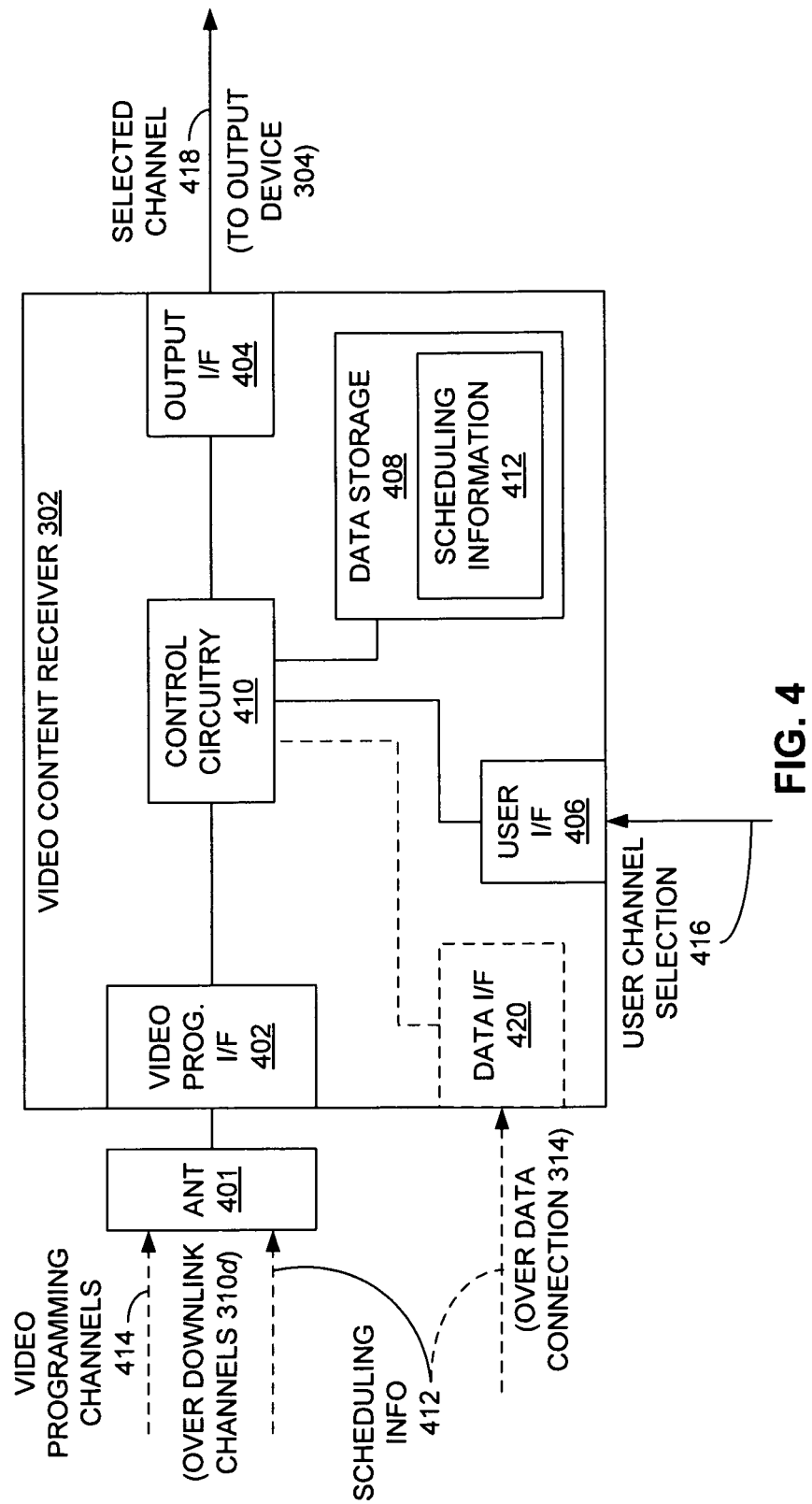
FIG. 4 is a block diagram of a video content receiver of the satellite television broadcast system of FIG. 3 according to an embodiment of the invention.

An example of one of the video content receivers 302 is depicted in FIG. 4. The video content receiver 302 shown therein includes a video programming interface 402, an output interface 404, a user interface 406, data storage 408, and control circuitry 410. Further, the receiver 302 may include a separate data interface 420. Other components, such as a digital video recorder (DVR), additional output interfaces 404 for multiple output devices 304, a removable electronic circuit (or "smart card") interface, and so forth, may also be incorporated within the receiver 302, but are not discussed herein to facilitate and focus the following discussion.

The video programming interface 402 is configured to receive video programming over multiple video programming channels 414 received by way of the downlink channels 310$d$ of FIG. 3. In one implementation, the video programming interface 402 receives the video programming of the downlink channels 310$d$ by way of a hyperboloid antenna 401 combined with a low-noise block-converter/feedhorn (LNBF), which collects and amplifies the incoming signals of the downlink channels 310$d$, down-converts the signals from microwave frequencies to intermediate frequencies, and forwards the signals to the video programming interface 402. While the above construction is particularly well-suited for satellite broadcast television communications, other methods of receiving satellite signals may be employed in other arrangements. In other implementations, the antenna/LNBF combination 401 may be considered part of the video programming interface 402.

The video programming interface 402 may also process the video programming received by way of the antenna 401, such as by way of programming channel selection or tuning of one or more programming channels 414, decryption and/or decoding of the channels 414, and the like. In one embodiment, the video programming is formatted according to one of the packet-based standards of the Motion Picture Experts Group (MPEG), such as MPEG-2 or MPEG-4, although other audio/video formats may be utilized in other implementations of the video content receiver 302.

The control circuitry 410 of FIG. 4 is configured to control the various components of the video content receiver 302, including the video programming interface 402 for the purpose of automatically selecting one of the video programming channels 414 as described in greater detail below. The control circuitry 410 may include one or more processors, such as a microprocessor, microcontroller, or digital signal processor (DSP), configured to execute instructions directing the processor to perform the duties discussed hereinafter. The control circuitry 410 may also include memory or data storage adapted to contain such instructions. Alternatively, the data storage 408 of FIG. 4 may contain the instructions and related data. In another embodiment, the control circuitry 410 may be hardware-based logic, or may include a combination of hardware, firmware, and/or software components.

Also depicted in FIG. 4 is data storage 408 employable by the control circuitry 410 to store scheduling information 412 describing the video programming to be carried over the video programming channels 414 received at the video programming interface 402. The data storage 408 may constitute any number of memory technologies, including volatile memory, such as dynamic random-access memory (DRAM) and static random-access memory (SRAM), and non-volatile memory, such as flash memory, magnetic disk drives, and optical disk drives.

The scheduling information 412 may be received at the video programming interface 402 via the downlink channels 310d. In another example, the scheduling information 412 is received by way of a data interface 420 by way of the data connection 314 depicted in FIG. 3. In one instance, the data interface 420 may include a connector and associated circuitry for transmitting information over a household telephone connection. In another example, the data interface 420 may include a wired or wireless interface for coupling the receiver 302 with a cable or digital subscriber line (DSL) gateway, or for communicating with a LAN router coupled to such a gateway for communicating over a WAN, such as the Internet, as discussed above. Other implementations may utilize one or more interfaces for different types of data connections 314 aside from those described herein.

The output interface 404 of the receiver 302 is configured to deliver the selected video programming, along with any audio associated with that programming, to the output device 304 of FIG. 3 coupled with the receiver 302 in a format usable by that device 304. For example, the video portion of the selected programming may be delivered by way of a modulated video cable connection, a composite or component video RCA-style (Radio Corporation of America) connection, and a Digital Video Interface (DVI) or High-Definition Multimedia Interface (HDMI) connection. The audio portion may be transported over a monaural or stereo audio RCA-style connection, a TOSLINK optical connection, or an HDMI connection. Other audio/video formats and related connections may be employed in other embodiments.

The user interface 406 is configured to receive a user channel selection 416, thus indicating to the control circuitry 410 which of the video programming channels 414 the user wishes to view by way of the output device 304 coupled with the output interface 404 of the receiver 302. In another example, the user channel selection 416 may be a channel the user selects to record a particular one of the received channels 414, such as by way of a DVR incorporated in the receiver 302. The user channel selection 416 may be made by way of a menu system provided by the control circuitry 410, a direct channel number entry, a "channel-up" or "channel-down" command, or by any other means indicating one of the video programming channels 414. The user interface 402 may be configured to receive other commands, such as recording timer commands, commands for viewing and navigating an electronic program guide (EPG), and others.

The user interface 406 may provide either or both of a control panel connection provided directly on the receiver 302, and a remote control interface. The remote control interface may receive commands from a remote control device (not illustrated in FIG. 4) transmitted over a radio frequency (RF) or infrared (IR) frequency band. Different communication methods, such as those employing optical or acoustic transmission of remote commands, may be used in other implementations.

Figure 5:
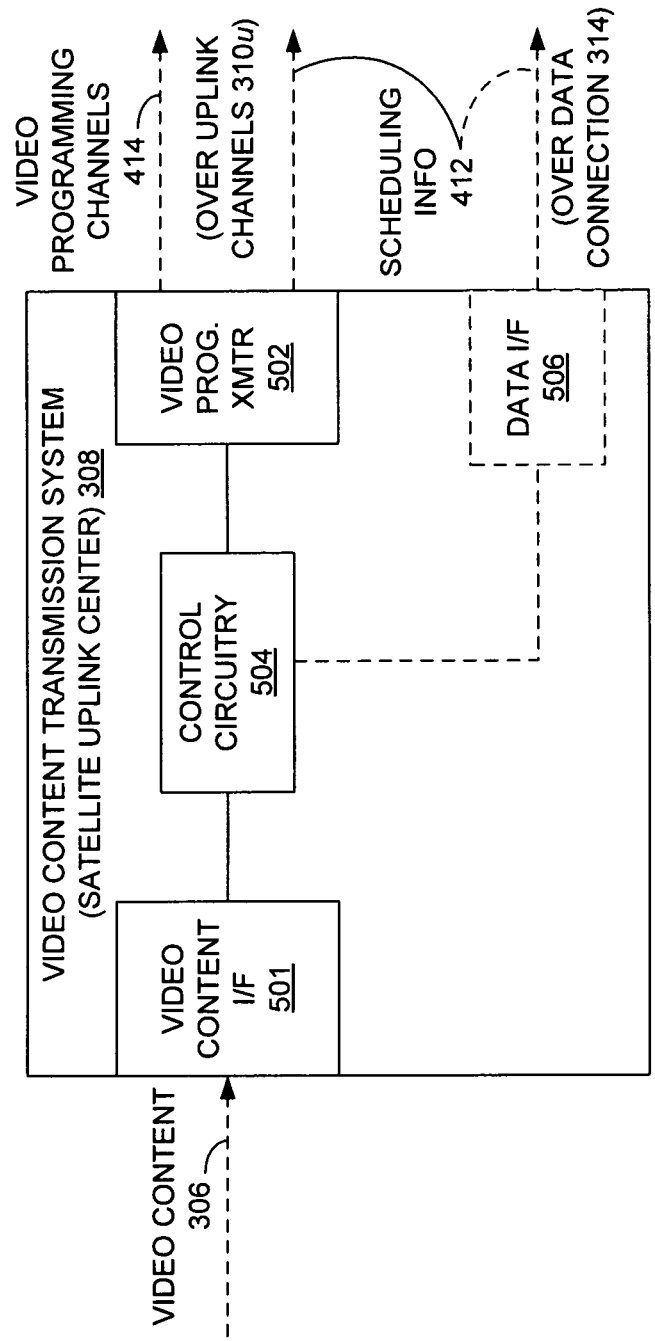
FIG. 5 is a simplified block diagram of a video content transmission system of the satellite television broadcast system of FIG. 3 according to an embodiment of the invention.

A version of the video content transmission system 308 (i.e., the satellite uplink center 308) is illustrated in FIG. 5. The transmission system 308 includes a video content interface 501, one or more video programming transmitters 502, control circuitry 504, and possibly a data interface 506. The video content interface 501 is configured to receive the incoming video content 306, and perform any processing on the content 306 that is necessary to produce the video programming for the programming channels 414 to be transmitted to the video content receivers 302.

The video programming transmitter 502 is configured to perform any frequency conversion, amplification, and other processing required to carry the video programming channels 414 over the uplink channels 310u to the satellite 312 of FIG. 3. Generally, the uplink channels 310u are transmitted via one of one or more large paraboloid or hyperboloid antennas (not depicted in FIG. 5) to the satellite 312, although other antenna structures may be employed to similar end.

The control circuitry 504 is configured to communicate and control both the video content interface 501 and the video programming transmitter 502. Further, the control circuitry 504 is configured to generate the scheduling information 412 mentioned above, and transfer the information 412 to the media content receivers 302. As with the media content receivers 302, the control circuitry 504 of the transmission system 308 may include one or more processors, such as microprocessors, microcontrollers, or DSPs, configured to execute instructions directing the processor to perform the duties discussed hereinafter. The control circuitry 504 may also include memory or data storage (not explicitly shown in FIG. 5) adapted to contain such instructions. In another embodiment, the control circuitry 504 may be hardware-based logic, or may include a combination of hardware, firmware, and/or software components.

In one example, the scheduling information 412 is transferred as metadata describing various aspects of the video programming channels 414. In another arrangement, the control circuitry 504 employs a data interface 506, such as an Internet or other WAN interface, including those employing cable or DSL connections, to transfer the scheduling information 412 over the data connection 314 of FIG. 3 to the video content receivers 302.

Generally, the scheduling information 412 identifies the particular video programming presented on each of the video programming channels 414, along with the expected time periods during which the programming is to be presented on the channels 414. Such information 412 is often used to provide the user with an electronic program guide (EPG) by which the user may determine which programs to record, which programs to view as they are broadcast, and the like. In one example, the scheduling information 412 may include information for each program scheduled to be broadcast or otherwise transmitted from the current time to some point in the future, such as seven days from the current time. The information for a specific program or event may include, for example, a program identifier, the name or title of the program, the programming channel 414 on which the program is to be presented, a brief text description of the program, viewer ratings, and other data.

In one specific example, the data programming channels 414 may conform to the Digital Video Broadcasting (DVB) standards associated with digital television transmission. Along with the video data being carried on the programming channels 414, the DVB standards facilitate transfer of the scheduling information 414 and related data by way of one or more information tables. Three of these tables may include a Network Information Table (NIT), a Service Description Table (SDT), and an Event Information Table (EIT). Generally, the Network Information Table (NIT) associates each of the programming channels 414 with the downlink channel 310*d* carrying that channel 414. For each of the programming channels 414 listed in the NIT, the Service Description Table (SDT) describes various access criteria for receiving that channel 414. For example, the SDT may indicate which subscription packages offered by the satellite television broadcast system 300 provide access to which of the transmitted channels 414. The Event Information Table (EIT) provides the majority of the scheduling information 412 described above for every program or event to be transferred over the video programming channels 414.

In the various scenarios described below, the control circuitry 504 of the uplink center 308 employs the scheduling information 414 to indicate whether a particular channel is carrying video programming for a particular time period. This information is then transferred to the video content receivers 302, which employ the information 414 to automatically select one of the programming channels 414 for presentation to a user based on the user channel selection 416 at the receiver 302.

Figure 6:
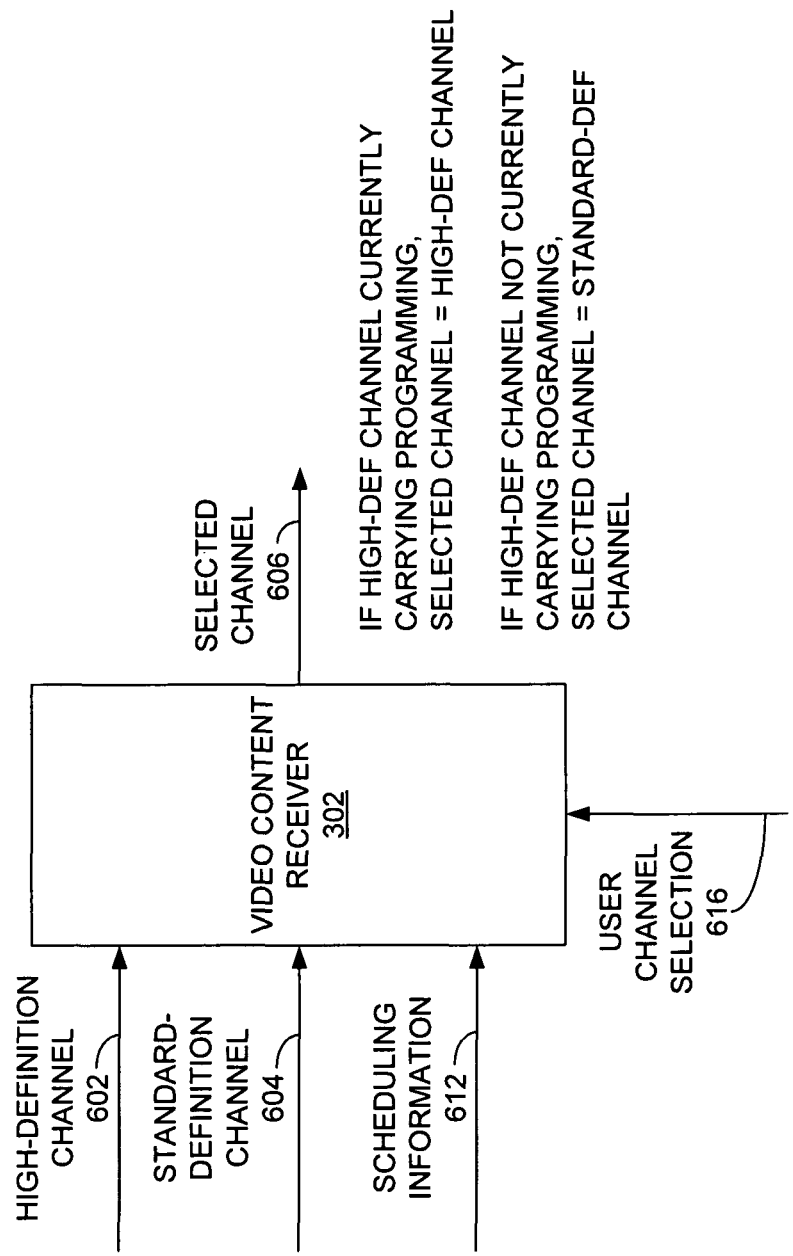
FIG. 6 depicts an example of automatic selection between a high-definition video programming channel and a standard-definition video programming channel paired with the high-definition channel according to an embodiment of the invention.

FIG. 6 provides one example in which a high-definition (HD) video programming channel 602 and a "paired" standard-definition (SD) video programming channel 604 are received at the video content receiver 302. For example, a national sports network such as ESPN, or a regional sports outlet such as Fox Sports Net Rocky Mountain (FSN-RM), typically provides both an HD channel 602 and a paired SD channel 604 that carry the same programming throughout the day, albeit at different video resolutions.

At times, the satellite television broadcast system 300 may not provide enough communication bandwidth over its uplink channels 310*u* and downlink channels 310*d* to carry programming for each of the HD channels available in the system continuously. As a result, operators of the system 300 may decide that only some of the HD channels available may be provided to the receivers 302 at any one time. For example, HD sports channels currently carrying a live sporting event may be transmitted, while other HD sports channels carrying other programs or events, such as interviews, biographies, or the like, may not be transmitted. In the latter case, the program or event may still be available to the user by way of the SD channel paired with the HD sports channels. However, if the user tunes to the HD sports channel at a time when a live sporting event is not being presented, the HD channel may not be carrying any video programming at that time. For example, a simple static video image, or "slate", may be presented indicating that no programming is currently being carried on that HD channel. Such an image would require little bandwidth to transmit, and would inform the user that the selected HD channel is currently unavailable.

In response to such a message, the user may then tune to the SD channel to watch the programming currently available on that channel. Alternatively, the satellite uplink center 308 and the video content receiver 302 may operate to automatically control the receiver 302 to tune to the HD channel under such circumstances by way of the scheduling information 612 received at the receiver 302.

In the scenario illustrated in FIG. 6, the control circuitry 504 of the satellite uplink center 308 may indicate in the scheduling information 612 that the HD channel 602 is not carrying video programming for a particular time period during a specific day. In one example, the one or more programs that are being transmitted on the paired SD channel 604 but not on the HD channel 602 may be denoted by way of a predetermined string of characters, such as "HDTV Currently Unavailable", appended to the textual description of each of the programs associated with the HD channel 602 as presented in the Event Information Table (EIT) described above. Upon receiving the scheduling information 612, the control circuitry 410 of the receiver 302 may then store the scheduling information 612, including the added description, in the data storage 408.

The control circuitry 410 of the receiver 302 may then receive a user channel selection 616 by way of the user interface 406 requesting that the HD channel 602 be displayed by way of the output interface 404 and the attached output device 304. In response, the control circuitry 410 may then review the description in the scheduling information 612 portion of the data storage 408 that is associated with the program expected to be shown on the HD channel 602 at the current time. If the control circuitry 410 detects the predetermined string in the textual description for the program, the control circuitry 410 will select the paired SD channel 604 for presentation to the user as the selected channel 606 of FIG. 6 instead of the requested HD channel 602, which is not currently carrying any video programming.

If, instead, the user subsequently provides another channel selection 616 to the receiver 302, but at a time during which the HD channel 602 is carrying programming, the control circuitry 410 will review the scheduling information 612 for the HD channel 602 for the program currently being transmitted, ascertain that the predetermined string is not present in the textual description associated with the program, and select the HD channel 602 indicated by the user for presentation as the selected channel 606 by way of the output interface 404.

In other implementations, the satellite uplink center 308 may employ other methods or means of indicating times during which a particular HD channel 602 is not carrying programming. For example, reserved or otherwise unused bits of descriptors within the Event Information Table (EIT) may be set or cleared to indicate that one or more programs will not be transmitted over the HD channel 602. Other data formats other than the EIT may be transmitted from the uplink center 308 to the receivers 302 by way of either the uplink and downlink channels 310 or the data connection 314 to relay information regarding the HD channel 602 in other implementations.

The current time value against which the control circuitry 410 of the receiver 302 compares the scheduling information 612 may also be received by way of metadata transferred by the satellite uplink center 308 over the uplink and downlink channels 310, or via the data connection 314. In other embodiments, the control circuitry 410 may retrieve the current time value by other means, such as by way of a timer server accessible by way of the Internet, or may maintain a current timer value within the receiver 302.

In a further embodiment, the control circuitry 410 of the receiver 302 may be configured to normally present the HD channel 602 to the user by way of the output interface 404 whenever the user selects the paired SD channel 604. In that case, if the user selects the SD channel 604 at a time when the HD channel 602 is not carrying any video programming, as indicated by the scheduling information 612, the control circuitry 410 of the receiver 302 selects the SD channel 604 originally identified by the user as the selected channel 606 for presentation.

Figure 7:
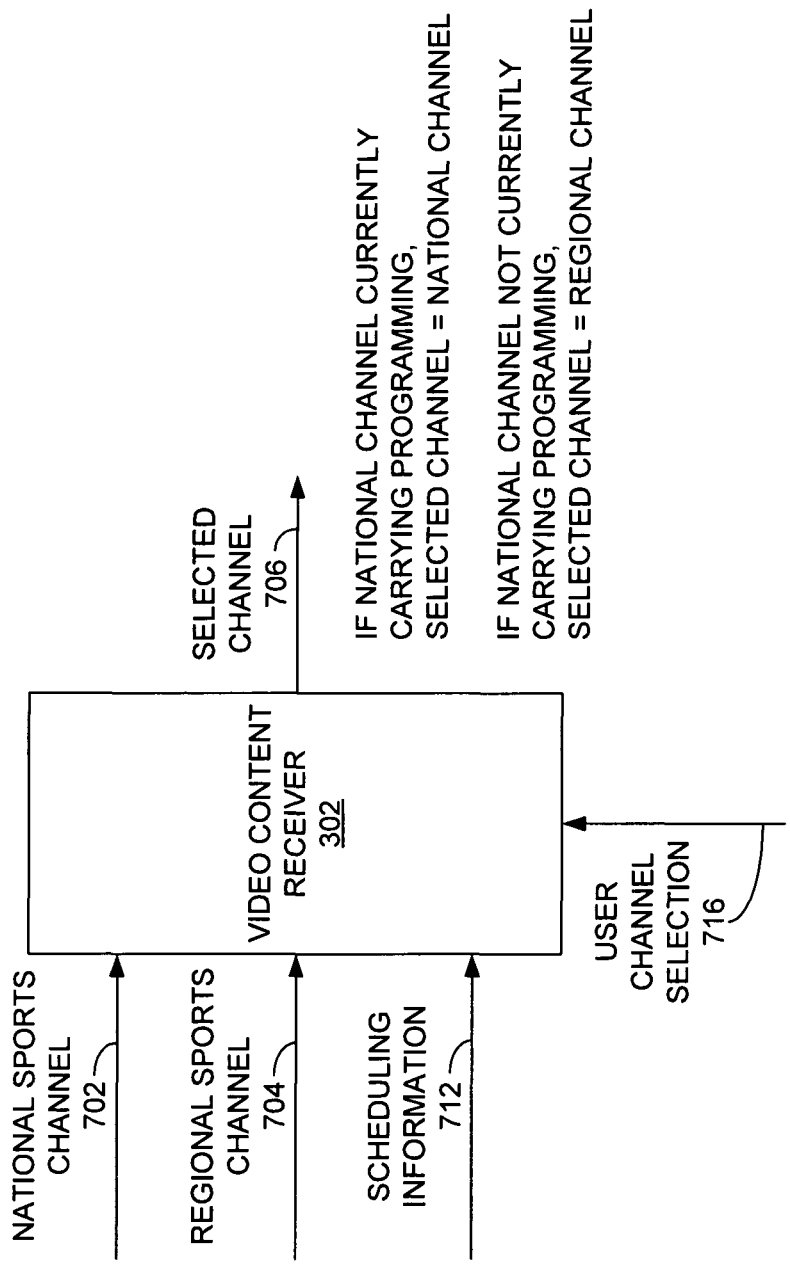
FIG. 7 depicts an example of automatic selection between a national sports channel and a regional sports channel associated with the same video programming event according to an embodiment of the invention.

FIG. 7 depicts a scenario in which the receiver 302 may select between two channels that are not specifically paired, unlike the case above with an HD channel and an SD channel provided by the same television network. In FIG. 7, a national sports channel 702, such as ESPN, and a regional sports channel 704, such as FSN-RM, may be scheduled to carry the same sporting event, such as a football game, during a specific time period. However, in some geographical areas served by the regional sports channel 704, the satellite television broadcast system 300 may be required by contractual agreement to "blackout" the game on the national sports channel 702, or prevent the game from being available to subscribers in those areas over the national sports channel 702, thus allowing only the regional sports channel 704 to broadcast the game in such regions. In this situation, scheduling information 712 associated with the national sports channel 702 generated by the uplink center 308 may indicate that the video programming carried on the national sports channel 702 is not available to subscribers or users in the affected geographical area during that period of time. As a result, if the user selects the national sports channel 702 during that time by way of a channel selection 716, the receiver 302 may respond in light of the scheduling information 712 by selecting the regional sports channel 704 as the selected channel 706 since the desired football game will not be available over the national sports channel 702 to users of the receivers 302 in the affected area at that time. Outside of the time period associated with the game, however, a user channel selection 716 of the national sports channel 702 may result in that same sports channel 702 being presented as the selected channel 706.

Under one implementation, the scheduling information 712 may include an indication of the geographical areas in which the national sports channel 702 is blacked out during the time the game is to be televised. For example, the geographical areas may be identified by way of postal codes, state counties or parishes, or other means. In other examples, the blackout may apply to specific groups or classes of subscribers or receivers 302 having a common characteristic, such as a defined subscription level, not necessarily related to a particular geographical area. In such cases, the scheduling information 712 may include an indication of the characteristic preventing the game from being presented to the user.

In another example, the uplink center 308 may identify the regional sports channel 704 in scheduling information 712 associated with the national sports channel 702 for the time period during which the football game is to be televised. As a result, the receiver 302 will be able to identify the regional sports channel 704 as the selected channel 706 based on the scheduling information 712 it has received. In another example, the receiver 302 may compare the event description provided in the scheduling information 712 of the blacked-out national sports channel 702 to those of other video programming channels 414 for events during the same time period to determine if any of the available channels 414 is carrying the same football game. If so, the receiver 302 may select such a channel as the selected channel 706 for presentation to the user.

Figure 8:
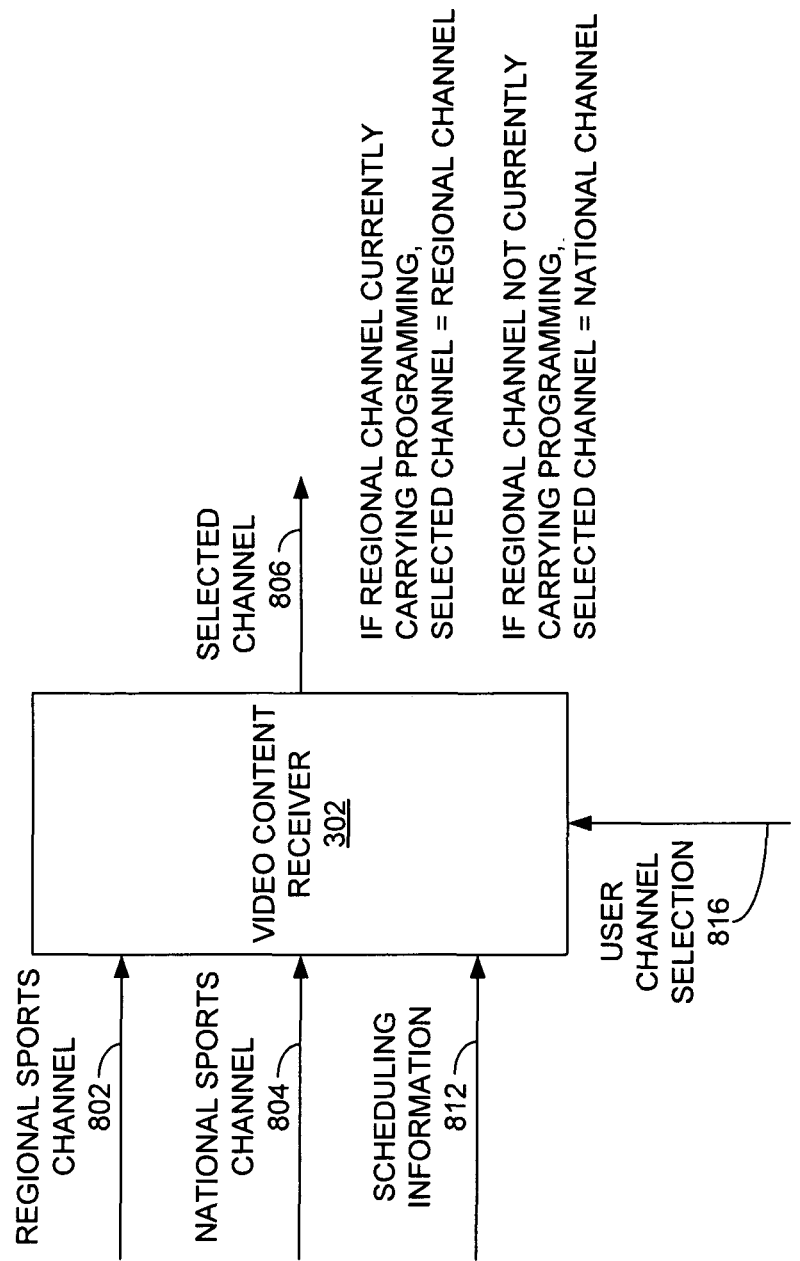
FIG. 8 depicts another example of automatic selection between a national sports channel and a regional sports channel associated with the same video programming event according to an embodiment of the invention.

FIG. 8 presents a similar example concerning a regional sports channel 802 and a national sports channel 804. In this scenario, the receiver 302 is located in a region not ordinarily associated with the geographical area served by the regional sports channel 802. For example, the receiver 302 may be located in Florida, while the regional sports channel 802 generally serves the Rocky Mountain region. However, the receiver 302 may be associated with a subscriber who is paying an additional fee for access to several regional sports channels, including the regional sports channel 802 of FIG. 8.

Presuming a basketball game is scheduled to be presented over both the regional sports channel 802 and the national sports channel 804, a contractual agreement may mandate that the regional sports channel 802 be blacked out in geographical areas outside the area generally served by the regional sports channel 802 for the duration of the basketball game. As a result, the satellite uplink center 308 may note this blackout in the portion of scheduling information 812 that is associated with the regional sports channel 802. Thus, if a user of a receiver 302 located in such an area selects the regional sports channel 802 by way of a user channel selection 816, the receiver 302 may process the scheduling information 812 and select the national sports channel 804 that is carrying the game at that time as the selected channel 806. Outside of the time period during which the basketball game is being broadcast, the receiver 302 may instead present the requested regional sports channel 802 as the selected channel 806.

While each of the embodiments portrayed in FIGS. 6-8 involved outputting a selected channel 606, 706, 806 to an output device, the selected channel 606, 706, 806 may be a channel selected for purposes of future recording on a DVR, setting a reminder to watch a particular show at the time it is broadcast, or any other function regarding selection of a particular video programming channel 414.

At least some embodiments as described herein provide a video content receiver and method for automatically selecting a particular video programming channel for viewing, recording, and/or other channel functions based on a user selection of the channel and on scheduling information regarding the user-selected channel. Generally, if the scheduling information indicates that a user-selected channel is not or will not be carrying video programming available to the user at the chosen time, then the receiver will select another video channel which may provide the same or similar content associated with the user-requested channel for viewer presentation, recording, and the like.

While several embodiments of the invention have been discussed herein, other implementations encompassed by the scope of the invention are possible. For example, while some embodiments disclosed herein have been described within the context of a television set-top box, other video content receivers, including, but not limited to, terrestrial and cable television set-top boxes, television sets, desktop and laptop computers, and portable communication devices, may benefit from application of the concepts explicated above. Further, while the scenarios described earlier deal primarily with video channels providing sports programming, other types channels providing a variety of programming, such as movies and news programs, may benefit from application of the numerous principles described herein. Also, while each implementation discussed earlier addresses video communications, other forms of communication channels, such as those carrying audio information in, for example, a satellite radio network, may also incorporate the various inventive concepts presented herein. In addition, aspects of one embodiment disclosed above may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of automatically selecting between a first video programming channel and a second video programming channel, the method comprising:
   in a video content receiver, receiving video programming carried over at least one of the first channel and the second channel;

in the video content receiver, receiving scheduling information regarding video programming carried over the first channel and the second channel;

in the video content receiver, receiving a channel selection for the first channel;

in the video content receiver, in response to receiving the channel selection, comparing the scheduling information regarding the video programming carried over the first channel to a current time value;

in the video content receiver, selecting the second channel for presentation to a user if the scheduling information for the current time value indicates the first channel is not currently carrying any video programming; and in the video content receiver, selecting the first channel for presentation to the user if the scheduling information for the current time value indicates the first channel is currently carrying video programming, wherein the scheduling information comprises information from an event information table of a digital video broadcasting signal, and wherein a predetermined string of alphanumeric characters in the scheduling information is used to indicate that the first channel is not currently carrying any video programming, the predetermined string of alphanumeric characters being independent of a channel identifier for either the first or second channel.

2. The method of claim 1, wherein:
the scheduling information regarding the video programming carried over the first channel comprises an identification of the second channel.

3. The method of claim 1, wherein:
the first channel comprises a high-definition channel; the second channel comprises a standard-definition channel paired with the first channel; and the channel selection is for the high-definition channel.

4. The method of claim 1, wherein:
at least one bit in the scheduling information set to a predetermined value indicates the first channel is not currently carrying any video programming.

5. The method of claim 1, wherein:
the scheduling information comprises information received from a wide-area network connection.

6. The method of claim 1, wherein:
the scheduling information comprises information received from a phone line connection.

7. A video content receiver, further comprising:
a video programming interface configured to receive video programming over a first video programming channel and a second video programming channel;
an output interface configured to output the video programming for presentation to a user;
a user interface that receives a channel selection for the first channel;
data storage configured to store scheduling information regarding video programming carried over the first channel and the second channel; and
control circuitry configured to:
  compare the scheduling information regarding the video programming carried over the first channel to a current time value;
  select the second channel for presentation using the output interface if the scheduling information for the current time value indicates the first channel is not currently carrying any video programming; and
  select the first channel for presentation using the output interface if the scheduling information for the current time value indicates the first channel is currently carrying video programming, wherein the scheduling information comprises information from an event information table of a digital video broadcasting signal, and wherein a predetermined string of alphanumeric characters in the scheduling information is used to indicate that the first channel is not currently carrying any video programming, the predetermined string of alphanumeric characters being independent of a channel identifier for either the first or second channel.

8. The video content receiver of claim 7, further comprising:
a phone line interface configured to receive the scheduling information;
wherein the control circuitry is configured to receive the scheduling information from the phone line interface and store the scheduling information in the data storage.

9. The video content receiver of claim 7, further comprising:
a wide-area network interface configured to receive the scheduling information;
wherein the control circuitry is configured to receive the scheduling information from the wide-area network interface and store the scheduling information in the data storage.

10. The video content receiver of claim 7, wherein:
the video programming interface is configured to receive the scheduling information; and
the control circuitry is configured to receive the scheduling information from the video programming interface and store the scheduling information in the data storage.

11. The video content receiver of claim 10, wherein:
the scheduling information comprises information from an event information table of a digital video broadcasting signal.

12. The video content receiver of claim 7, wherein:
the first channel comprises a high-definition channel;
the second channel comprises a standard-definition channel paired with the first channel; and
the channel selection is for the high-definition channel.

13. A method of automatically selecting between a first video programming channel and a second video programming channel, the method comprising:
in a video content receiver, receiving video programming carried over at least one of the first channel and the second channel;
in the video content receiver, receiving scheduling information regarding video programming carried over the first channel and the second channel;
in the video content receiver, receiving a channel selection for the first channel;
in the video content receiver, in response to receiving the channel selection, comparing the scheduling information regarding the video programming carried over the first channel to a current time value;
in the video content receiver, selecting the second channel for presentation to a user if the scheduling information for the current time value indicates the first channel is not currently carrying video programming that is available for presentation to the user; and
in the video content receiver, selecting the first channel for presentation to the user if the scheduling information for the current time value indicates the first channel is currently carrying video programming that is available for presentation to the user;

wherein:
the scheduling information indicates that the first channel and the second channel are scheduled to carry a first event;
the first event is prevented from being presented to the user by way of the first channel due to a geographic or a subscription level characteristic associated with the video content receiver; and
a predetermined string of alphanumeric characters in the scheduling information is used to indicate that the first channel is not currently carrying video programming that is available to the user, the predetermined string of alphanumeric characters being independent of a channel identifier for either the first or second channel.

14. The method of claim 13, wherein:
at least one bit in the scheduling information set to a predetermined value indicates the first channel is not currently carrying video programming that is available to the user.

15. The method of claim 1, wherein an absence of the predetermined string of characters in the scheduling information indicates that the first channel is currently carrying video programming.

* * * * *